(12) United States Patent  
Moriyama

(10) Patent No.: US 8,873,911 B2
(45) Date of Patent: Oct. 28, 2014

(54) OPTICAL MODULE WITH PIG-TAILED FIBER AND METHOD TO ASSEMBLY THE SAME

(75) Inventor: Yutaka Moriyama, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 252 days.

(21) Appl. No.: 13/353,940

(22) Filed: Jan. 19, 2012

(65) Prior Publication Data

US 2012/0189251 A1 Jul. 26, 2012

(30) Foreign Application Priority Data

Jan. 20, 2011 (JP) ................... 2011-009611

(51) Int. Cl.
*G02B 6/36* (2006.01)
*G02B 6/30* (2006.01)
*G02B 6/42* (2006.01)

(52) U.S. Cl.
CPC .............. *G02B 6/4237* (2013.01); *G02B 6/421* (2013.01)
USPC ..................... 385/49; 385/52; 385/78; 385/91

(58) Field of Classification Search
USPC .................. 385/49, 52, 72, 78, 88, 91, 92
See application file for complete search history.

(56) References Cited

U.S. PATENT DOCUMENTS 5,841,923 A * 11/1998 Kyoya ............................ 385/93
6,179,483 B1 * 1/2001 Kanazawa ...................... 385/93
7,585,120 B2 * 9/2009 Ito et al. ......................... 385/93

FOREIGN PATENT DOCUMENTS

JP 63161405 A * 7/1988 .............. G02B 6/24
JP 05-037025 2/1993
JP 2004-226474 8/2004

* cited by examiner

*Primary Examiner* — Daniel Petkovsek
(74) *Attorney, Agent, or Firm* — Venable LLP; Michael A. Sartori; George L. Howarah

(57) ABSTRACT

A method to assemble a pig-tailed optical module and an arrangement thereof are disclosed. The method includes a step to recover the optical coupling efficiency between the optical device in the optical module and the pig-tailed fiber. The method includes a step to iterating the YAG laser welding at points axially distributed but with an inconstant pitch as slightly rotating the optical module around the optical axis of the pig-tailed fiber clock wise and counter clock wise depending on the enhancement and/or the degradation of the optical coupling efficiency between the optical device and the pig-tailed fiber.

3 Claims, 2 Drawing Sheets ered in advance to the YAG laser welding causes substantial optical loss between the pig-tailed

OPTICAL MODULE WITH PIG-TAILED FIBER AND METHOD TO ASSEMBLY THE SAME

BACKGROUND OF THE INVENTION

1. Field of the Invention

The present invention relates to a method to manufacture an optical module, in particular, the method according to the present invention relates to manufacture an optical module implementing with, what is called, a pig-tailed arrangement and an arrangement of the optical module.

2. Related Prior Art

An optical module applicable to the optical communication system generally comprises a housing that installs a semiconductor optical device such as a semiconductor light-emitting device and a coupling mechanism to couple to a pig-tailed optical fiber with the optical device. The process to align the pig-tailed fiber with the housing, in particular, to assemble the coupling member with the housing generally applies, what is called, the YAG laser welding. However, the YAG laser welding often causes the misalignment between the coupling member and the housing, where they are optically aligned once in advance to the YAG laser welding, which causes substantial optical loss between the pig-tailed fiber and the semiconductor light emitting device. Various techniques have been proposed to compensate the misalignment by the YAG laser welding.

FIG. 2 is a cross section of an optical module taken along the optical axis of the ferrule 14 and explains the mechanism to cause the misalignment after the YAG laser welding. A conventional process to assemble the ferrule 14 with the ferrule holder 13 is such that: the piercing welding for the ferule 14 by the YAG laser beam is firstly performed for the ferrule holder 13 at a longitudinal center X12 thereof; then, the fillet welding also by the YAG laser beam is carried out for the end X13 of the ferrule holder 13. Subsequently, the assembly of the ferrule 14 with the ferrule holder 13 is optically aligned with the optical device 12 as sliding the ferrule holder 13 on the end surface of the window holder 11a and fixed thereto by the fillet welding by using the YAG laser beam at the position X11. The YAG laser welding for the points, X11 to X13, are generally done for a plurality points each radially distributed with an equal angle.

However, the fillet welding at the position X11 sometimes causes the misalignment between the assembly, 13 and 14, and the optical device 12, which are optically aligned once in advance to the fillet welding. Moreover, when the optical coupling between the optical device 12 with the pig-tailed fiber 15 is insufficient compared with the preset value after the fillet welding at the point X11, some additional welding will be necessary to be carried out.

One technique to recover the optical coupling has been known, where a point just between the points, to which the prior welding, X11 to X13, are carried out, is first irradiated by the YAG laser beam as rotating the optical module 10 around the optical axis. When the optical coupling recovers the preset value, the process to assemble the optical module 10 is completed. When the optical coupling improves but the practical value is still insufficient for the preset value, an additional welding will be iterated as slightly rotating the optical module 10 from the current position until the preset value will be obtained.

On the other hand, when the optical coupling after the first slight rotation degrades from a former value, which means that the rotation angle done before the additional welding is reverse, the optical module 10 recovers the position of the first one point welding, then the optical module is slightly rotated in a reverse angle and carried out the one point welding.

When the first one point welding after the rotation of the optical module 10 degrades the optical coupling efficiency, which means that the first rotation is incorrect, the optical module 10 will be rotated by 180° from the position of the first one point welding and iterated the procedures of the slight rotation and the one point welding until the preset value for the optical coupling will be obtained. Thus, the conventional method to recover the optical coupling efficiency iterates the step of the one point welding as slightly rotating the optical module. However, when the iterating welding continues, the ferrule holder 13 sometimes leaves no space to be welded to the ferrule 14, or, the iterated number of the welding results in a rigid fixation of the ferrule holder 14 with the ferrule such that no improvement in the optical coupling efficiency is obtained in the following welding.

SUMMARY OF THE INVENTION

An aspect of the present invention relates to a method to assemble an optical module having a pig-tailed optical fiber. The method may include steps of: (a) welding an auxiliary holder to a housing of the optical module, where the auxiliary holder covers a window holder to support a window through which the light coupling the with the optical device and the pig-tailed fiber passes; (b) welding a ferrule that terminates the pig-tailed fiber with a ferrule holder; (c) aligning the pig-tailed fiber with the optical device; and (d) welding the ferrule holder with the auxiliary holder.

The method of the invention may further include a step of, in order to recover the optical coupling efficiency degraded in step (d), iterating the welding the ferrule holder with the ferrule, or the auxiliary holder with the window holder, as rotating the optical module slightly in a direction or in a reverse direction depending on the improvement or the degradation of the optical coupling efficiency.

Another aspect of the present invention relates to an arrangement of the pig-tailed optical module. The optical module may include a ferrule, a ferrule holder, an auxiliary holder, a housing including a window holder. The ferrule terminates the pig-tailed fiber. The ferrule holder welded to the ferrule receives the ferrule. The auxiliary holder has a ceiling to which the ferrule holder is welded. The housing installs an optical device optically coupled with the pig-tailed fiber and a window holder covered by the auxiliary holder. The auxiliary holder is welded with the housing and to the window holder.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF PREFERRED EMBODIMENTS

Figure 1:
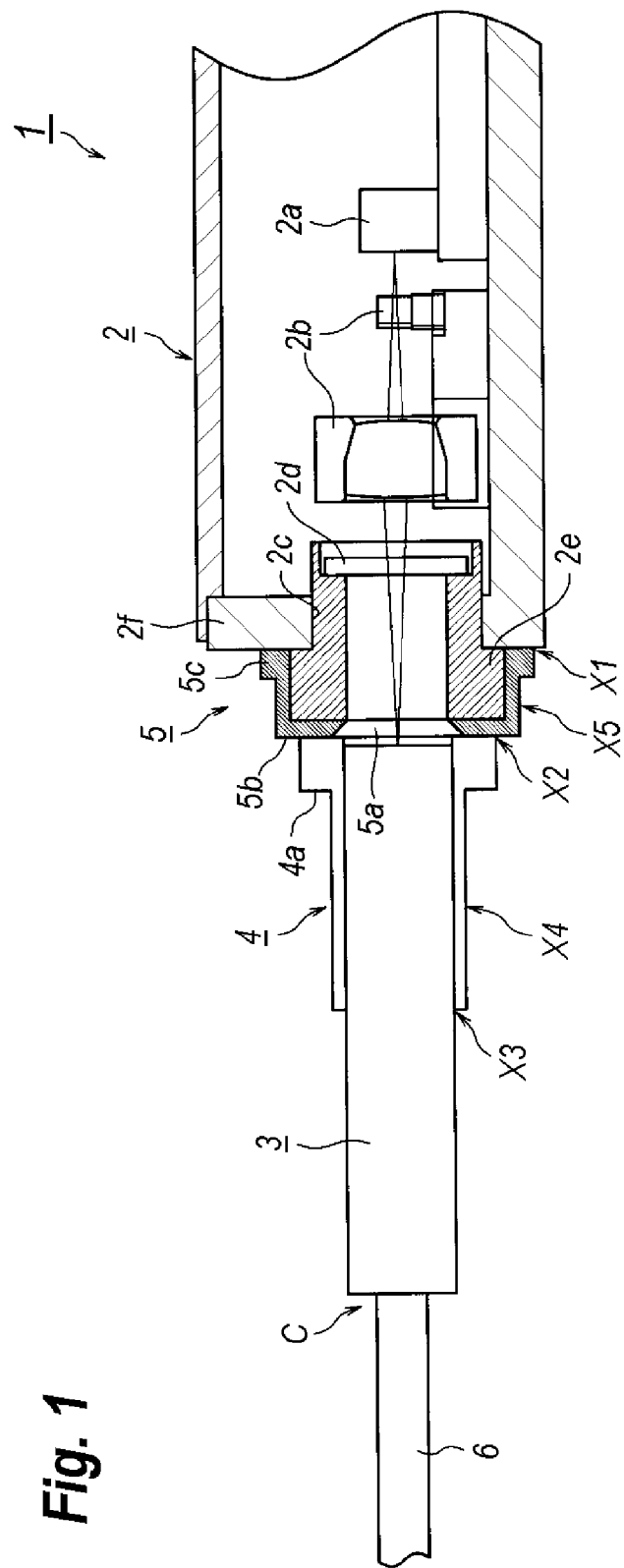
FIG. 1 shows a cross section of the optical module according to an embodiment of the present invention.

Next, an optical module with the pig-tailed fiber according to an embodiment of the present invention will be described as referring to FIG. 1 that omits a portion of the optical module. AS shown in FIG. 1, the optical module 1 of the embodiment includes a housing 2, a ferrule 3 made of metal, a ferrule holder 4, and an auxiliary holder 5. The ferrule 3, the ferrule holder 4, and the auxiliary holder 5 constitute the coupling portion of the pig-tailed optical module 1.

The housing 2 encloses a semiconductor optical device 2a, which is typically a semiconductor laser diode (hereafter denoted as LD), and some optical components 2b such as, for instance, an optical lens. An aperture 2c provided in one of the sidewalls 2f is covered by a window holder 2e that supports a window 2d through which the light coming from the LD 2a passes. The window holder 2e, which includes a cylinder and the window 2d to cover one open end of the cylinder, is assembled with one of the sidewalls 2f of the housing 2 to cover the aperture 2c formed thereat.

The ferrule 3, which may be made of metal and have a cylindrical shape, terminates the pig-tailed fiber 6. The pig-tailed fiber constitutes the optical cable C. The ferrule holder 4, which receives and protects the metal ferrule 3, may be also made of metal cylinder. The ferrule holder 4 may be welded with the ferrule 3 by the piercing welding, specifically, by irradiating the YAG laser beam on the side surface X4 of the ferrule holder 4 to pierce the YAG laser beam through the ferrule holder 4 to reach the metal ferrule 3. The ferrule holder 4 may be attached to the holder 5, which is fixed to the housing 2, by the YAG laser welding.

The holder 5 may be a member to be provided to recover the misalignment by the YAG laser welding and fully covers the window holder 2e in portion exposed from the sidewall 2f of the housing 2. The holder 5 includes a ceiling 5b forming an aperture 5a thereat and a flange 5c. The ceiling 5b fixes the ferrule holder 4 thereto by the YAG laser welding; while, the flange 5c is welded to the sidewall 2f of the housing 2. The holder 5 may be made of material to which the YAG laser welding is available, typically made of austenitic steal with relatively lesser thermal conductivity to lower the thermal diffusion of the dissolution heat by the YAG laser irradiation. An alloy of FeNiCo, which is often called as Kovar, may be applicable for the material of the holder 5.

Figure 2:
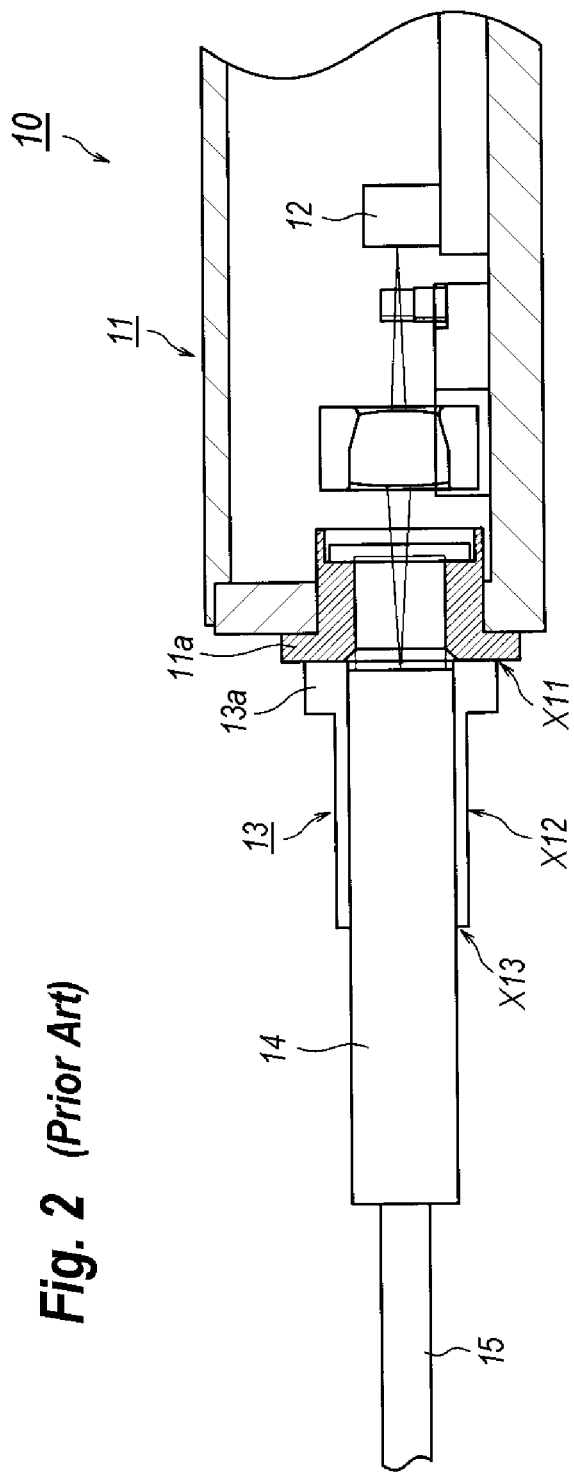
FIG. 2 shows a cross section of a conventional optical module.

The holder 5 may have a height, or a length, from the ceiling 5b to the flange 5c of, for instance, 1.2 to 1.5 mm. In the conventional optical module shown in FIG. 2, the window holder 11 has a flange 11a with a thinner thickness of about 0.5 mm. While, the present optical module 1 has the window holder 2e with the flange whose thickness is greater than the thickness of the conventional window holder 11 and the holder 5 fully covers this thicker flange to facilitate the piercing welding.

The optical module 1 may be assembled, namely, the ferrule 3 is aligned with the housing 2 such that the light emitted from the LD 2a is concentrated on the end of the pig-tailed fiber 6 exposed in the end of the ferrule 3 by passing through the optical lens 2b and the window 2d.

Next, a method to assemble the optical module 1 will be described. The method first covers the window holder 2e by the holder 5 and performs the fillet welding of the flange 5c of the holder with the sidewall 2f of the housing at the point X1 by the YAG laser beam. Next, the ferrule holder 4, which receives the ferrule 3 therein, is welded to the holder 5 as aligning the ferrule 3 optically with the LD 2a. In the optical alignment of the ferrule holder 4, the LD 2a practically emits light and this light is monitored through the optical cable C.

Further specifically, in the optical alignment within the plane perpendicular to the optical axis of the LD 2a, or the pig-tailed fiber 6 in the ferrule 3, an operation to slide an assembly of the ferrule holder 4 with the sleeve 3, where the ferrule 3 is fixed with the ferrule holder 4 by the fillet welding at positions X3 and the piercing welding at positions X4, on the ceiling 5b of the holder 5 may determine the position of the assembly. While, the mechanical design of the ferrule 3 and that of the ferrule holder 4 may determine their relative position along the optical axis without performing any optical alignment. The optical coupling efficiency along the optical axis shows far dull dependence on the relative position comparing with the alignment within the plane perpendicular to the axis.

The YAG laser welding in the fillet welding or the piercing welding for the ferrule 3 and the ferrule holder 4 are carried out such that the laser beam output from the YAG laser is divided into three beams and these beams are irradiated on the ferrule holder 4 at the same time distributed apart by an equal angle (120°). When the optical coupling efficiency between the LD 2a and the pig-tailed fiber 6 exceeds a preset value, the assembly of the optical module 1 is completed. However, when the coupling efficiency is less than the value, additional steps described below will be followed.

That is, the YAG laser welding for the ferrule holder 4 at only a point without dividing the laser beam, as rotating the optical module 1 around the optical axis of the ferrule 3, is iterated until the optical coupling between the LD 2a and the fibber 6 exceeds the preset value. Specifically, rotating the optical module 1 by 60° around the optical axis from the position where the three points welding as dividing the laser beam into three beams is carried out, the point just between the two welded points is first irradiated. When the optical coupling recovers but the absolute value thereof is still less than the preset value, the optical module 1 is further slightly rotated to carry out the one point welding.

Iterating the slight rotation of the optical module 1 and the one point welding, the optical module 1 may attain the preset value, and the process to assemble the module 1 is completed. However, such an iterating welding often causes the rigid fixation of the ferule holder 4 with the ferrule 3 to impede the fine adjustment, or sometimes leaves no space to carry out the subsequent one point welding. In such a case, the holder 5 may provide a room X5 for the YAG laser welding against the window holder 2e.

As holding the rotation angle of the optical module 1, the position, to which the YAG laser beam is irradiated, moves on the surface X5 of the holder 5, then, the one point welding is carried out. When the optical coupling efficiency after the welding for the holder 5 exceeds the preset value, the process to assemble the module will be completed. When the optical coupling is still under the preset value but improves for the last one, the piercing welding for the holder 5 will be performed as further rotating the optical module 1 slightly from the immediately before the position until the preset value is obtained.

On the other hand, when the optical coupling efficiency degrades after the first piercing welding for the holder 5, the optical module is rotated by 180° and the one point welding will be performed for the holder 5.

Because the holder 5 is assembled close to the housing 2 compared with the ferrule holder 4, which results in a different dependence of the optical coupling efficiency on the one point welding, the additional weddings for the holder 5 are necessary to follow the same procedures for the ferrule holder 4.

(First Modification)

When the first one point welding for the auxiliary holder 5 degrades the optical coupling efficiency as holding the rotation angle of the optical module but the point for the welding shifts from the ferrule holder 4 to the auxiliary holder 5, the subsequent iteration of the slight rotation and the one point welding will be carried out by the point to which the one point welding as the base is performed without rotating the optical module by 180°. The degradation in the optical coupling efficiency is assumed to be due to the longitudinal shift of the point from the ferrule holder 4 to the auxiliary holder 5 not the misdirection of the rotation angle.

(Second Modification)

When the first welding for the auxiliary holder 5 may not bring the optical coupling efficiency insufficient for the preset value, the subsequent slight rotation of the optical module 1 may increase the angle thereof compared with the slight rotation angle after the welding for the ferrule holder 4, for instance, the slight rotation angle for the auxiliary holder 5 may be double of those for the ferrule holder 4. Because the auxiliary holder 5, in particular the points to be welded, comes close to the end of the ferrule 3 compared to the welded point of the ferrule holder 4, which makes the dependence of the misalignment by the welding in dull. An increased rotation angle may result in substantial change of the optical coupling efficiency.

(Third Modification)

Aforementioned processes for the additional welding first carry out in the ferrule holder 4 then the auxiliary holder 5. However, the process of the present invention may first perform the additional welding for the auxiliary holder 5 then the ferrule holder 4 when the auxiliary holder 5 leaves no space to be welded.

In the foregoing detailed description, the method and apparatus of the present invention have been described with reference to specific exemplary embodiments thereof. It will, however, be evident that various modifications and changes may be made thereto without departing from the broader spirit and scope of the present invention. For instance, although the embodiments described above concentrate on the optical module installing the LD as the light-emitting device, the arrangement of the holder 5 and the method to assemble the module may be applicable to an optical module installing a light-receiving device. In such a case, the optical alignment between the pig-tailed fiber and the light-emitting device may be performed by practically receiving light by the light-receiving device from the pig-tailed fiber. Accordingly, the present specification and figures are accordingly to be regarded as illustrative rather than restrictive.

I claim:

1. A method to assemble an optical module with a pig-tailed fiber, comprising steps of:
   (a) welding an auxiliary holder to a housing of the optical module by a YAG laser beam, the auxiliary holder covering a window holder that supports a window to pass light for coupling the pig-tailed fiber optically with an optical device installed in the housing;
   (b) welding a ferrule that terminates the pig-tailed fiber with a ferrule holder by the YAG laser beam;
   (c) aligning the pig-tailed fiber with the optical device by sliding the ferrule holder on the auxiliary holder to attain optical coupling efficiency between the optical device and the pig-tailed fiber;
   (d) welding the ferrule holder with the auxiliary holder by the YAG laser beam; and
   (e') welding the auxiliary holder with the window holder to recover the optical coupling efficiency degraded in step (d).

2. The method of claim 1,
   wherein the step (e') includes steps of,
   (e'-1) welding the auxiliary holder with the window holder at a point between points at which the auxiliary holder is welded with the window holder in step (d), and
   (e'-2) when step (e'-1) fails to recover the optical coupling efficiency degraded in step (d), iterating a step of welding the auxiliary holder with the window holder as slightly rotating the optical module around an optical axis of the pig-tailed fiber until the optical coupling efficiency exceeds a preset value.

3. The method of claim 2,
   wherein step (e'-2) includes steps of,
   welding the auxiliary holder with the window holder as slightly rotating the optical module clock wise around the optical axis of the pig-tailed fiber, and
   welding the auxiliary holder with the window holder as slightly rotating the optical module counter clock wise when the optical coupling efficiency degrades compared with the optical coupling efficiency measured after a last welding.

* * * * *